United States Patent [19]
Schmidt

[11] 3,831,619
[45] Aug. 27, 1974

[54] APPARATUS FOR ACCURATELY MAINTAINING SMALL UNDERPRESSURES IN A TANK SYSTEM WHICH IS CONNECTED TO A GAS SUCTION INSTALLATION

[75] Inventor: Albrecht Schmidt, Nieder-Roden, Germany

[73] Assignee: Licentia Patent-Verwaltungs-GmbH, Frankfurt/Main, Germany

[22] Filed: July 18, 1973

[21] Appl. No.: 380,267

[30] Foreign Application Priority Data
July 21, 1972  Germany............................ 2235757
July 21, 1972  Germany...................... 7227026[U]

[52] U.S. Cl................................. 137/206, 137/254
[51] Int. Cl. ........................................... G05d 16/00
[58] Field of Search ............. 137/206, 154, 14, 386, 137/251, 254

[56] References Cited
UNITED STATES PATENTS

| | | | |
|---|---|---|---|
| 2,398,205 | 4/1946 | Buckwald .......................... | 137/253 |
| 2,588,214 | 3/1952 | Dawson .......................... | 137/253 X |
| 3,072,550 | 1/1963 | Fortescue ...................... | 137/253 X |
| 3,126,906 | 3/1964 | Touzalin ......................... | 137/254 X |

*Primary Examiner*—Alan Cohan
*Attorney, Agent, or Firm*—McGlew and Tuttle

[57] ABSTRACT

An apparatus for accurately maintaining small underpressures in a tank system which is connected to a gas suction installation comprises a vessel which is partly filled with liquid and which has a partition wall which extends downwardly from the top thereof and terminates below the liquid level. A tank system which has one tank or plurality of tanks which are partly filled with liquid is connected to a gas colleciton conduit above the liquid level and this gas collection conduit terminates in a first chamber portion of the vessel on one side of the partition wall above the liquid level. In addition, a gas suction installation conduit is connected into the same chamber and terminates in a lower end opening in the vicinity of the liquid level. An external air conduit is connected into the second chamber on the opposite side of the partition wall. An equalizing compensating tube is connected between the first and second chambers through the partition wall and the respective ends terminate at distinctive levels in the respective chambers so that they will lay slightly below the top of the water level therein. The gas suction installation conduit lies with its lower open end located above the discharge height of a discharge conduit of the second chamber by an amount corresponding to the desired underpressure. The first chamber has a discharge conduit which lies above the termination of the gas suction installation conduit.

3 Claims, 1 Drawing Figure

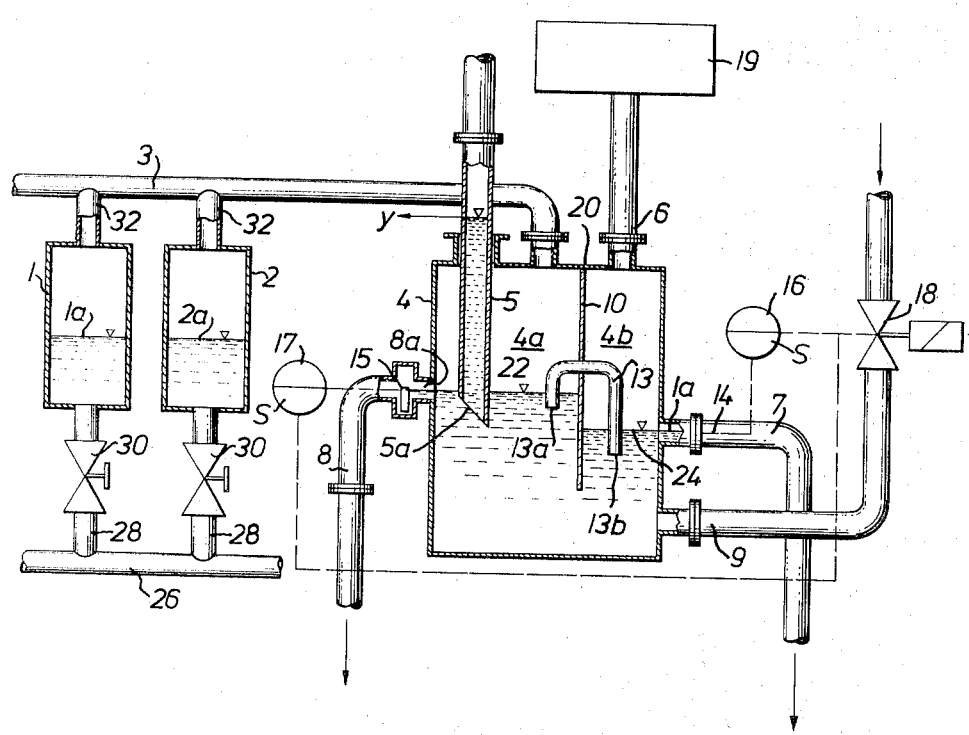

APPARATUS FOR ACCURATELY MAINTAINING SMALL UNDERPRESSURES IN A TANK SYSTEM WHICH IS CONNECTED TO A GAS SUCTION INSTALLATION

BACKGROUND OF THE INVENTION

1. Field of the Invention

This invention relates in general to devices for controlling the pressures in tank systems and, in particular, to a new and useful device for accurately maintaining small underpressures in a tank system which is connected to a gas suction installation.

2. Description of the Prior Art

The present invention has particular application in respect to tank systems in which it is extremely important that the pressure in the system be maintained at a definite value. In reactor engineering as well as in chemical engineering, there are many cases in which definite underpressures are produced in the tank systems and they must be maintained in spite of variable levels of the liquid therein. Especially in tanks dealing with radioactive materials, there is a definite need for a simple and accurate means for producing constant under-pressures within a certain range of operation in order to permit the control, supply and removal of the air aspirated or displaced by the variations in the liquid level. Different methods are known for keeping underpressures constant in tanks and tank systems. The most frequently used method is the control of the level of the tanks by regulating elements, i.e. by measuring the output value and comparing it with a desired value and therefore, regulating the quantities of liquid which is delivered into and out of the tanks. Such a method requires a relatively high expenditure and this increases in accordance with the accuracy of the regulation which is necessary.

SUMMARY OF THE INVENTION

In accordance with the present invention, a simple and accurate installation or apparatus for maintaining small underpressures in an operating tank system which is connected to a gas suction installation is provided. With the inventive arrangement, a tank or vessel which is connected to a gas suction installation is divided into two chamber portions by a partition which extends downwardly from the top thereof and terminates below the liquid level therein. One of the chambers is connected to a tank system comprising a plurality of individual tanks having liquid therein at a variable level and with a gas or air space at the top which is connected to the top of the first chamber of the vessel along with a connection from a gas suction installation. The gas suction installation connection comprises a conduit which extends downwardly into the first chamber and is located with an open mouth at the lower end below the level of the liquid in the vessel chamber. An external air conduit is connected into the top of the other chamber and a U-shaped equalizing and compensating tube is connected through the partition and terminates in respective open ends which are located directly below the respective liquid levels in each of the two chambers of the vessel. A liquid inlet is connected into the vessel below the liquid level and it is advantageously located in the vicinity of the second chamber. The liquid discharge conduit is connected to the first chamber and it includes an inlet opening area at the water level which lies over a similar discharge for the second chamber by an amount of height which corresponds to the desired head of the underpressure that is to be maintained. The discharge opening height at the connection to the vessel lies above the termination of the lower end of the gas suction installation conduit. Such a simple system provides the accurate maintenance of an underpressure inasmuch as only so much air is delivered to the vessel as is displaced by the inflowing or outflowing liquid. In the preferred arrangement, the inlet flow of liquid to the vessel is controlled in accordance with the level of the outlet in each of the chambers.

Accordingly, it is an object of the invention to provide an improved apparatus for accurately maintaining small underpressures in a tank system which is connected to a suction gas installation.

A further object of the invention is to provide a tank system which is simple in design, rugged in construction and economical to manufacture.

For an understanding of the principles of the invention, reference is made to the following description of a typical embodiment thereof as illustrated in the accompanying drawing.

BRIEF DESCRIPTION OF THE DRAWING

The only FIGURE of the drawings is a schematic, transverse sectional view of an apparatus for accurately maintaining small underpressures in a tank system constructed in accordance with the invention.

GENERAL DESCRIPTION OF THE PREFERRED EMBODIMENT

Referring to the drawings in particular, the invention embodied therein comprises an arrangement or apparatus for accurately maintaining a small underpressure in a tank system which is connected to a gas suction installation. The installation comprises a vessel 4 which is partly filled with a liquid and which is divided into two separate chambers 4a and 4b by a partition 10 which extends downwardly from a top wall 20 and which terminates below liquid levels 22 and 24 in respective tank chambers 4a and 4b.

A tank system comprising a plurality of separate tanks 1,2, etc. are supplied with liquid from a separate conduit 26 through branch conduits 28 each having a regulating valve 30 therein so as to maintain predetermined liquid levels 1a,2a, etc. in the respective tanks. The gas space above the liquid levels are connected through conduits 32 to a common tank system gas collecting conduit 3 which connects into the top of the chamber 4a of the vessel 4. The gas suction installation connects the vessel 4 through a gas suction installation conduit 5 which extends downwardly through the first chamber 4a and terminates in a lower opening 5a which extends obliquely and is located below liquid level 22.

An external air conduit 6 is connected into the top of the chamber 4b above the water level 24.

In accordance with the invention, a separate liquid discharge 7 is provided for the chamber 4b and a liquid discharge conduit 8 for the chamber 4a. The opening 5a of the gas suction installation conduit 5, lies above opening 7a of the connection of the liquid discharge conduit 7 by a height equivalent to a head which corresponds to the desired underpressure of the operation of the apparatus. In addition, the discharge conduit 8 for the chamber 4a includes a connecting opening 8a which is located over the opening 5a for the gas installation discharge conduit 5. Thus, by providing a construction of this nature, the underpressure is attained substantially constant during the operation of the device including the variation of the liquid levels which are produced by the operating conditions. The advantages of the invention lay in the simple constructive arrangement which insures a very great operational liability and in the fact that a very great accuracy is obtained in maintaining a constant underpressure in the installation and independently of the underpressure in the separate air suction installation connected to the conduit 5. When this system is used in reactor engineering, it insures an accurate separation of the contaminated air from the tank having a radioactive content from the surrounding space air and makes it possible to effect a long period of dwell of the air in the tank system.

Equilibrium between the chambers 4a and 4b is established by an equalizing and compensating conduit 13 of U-shaped configuration which extends through the partition 10 and which terminates in respective level openings 13a and 13b in respective chambers 4a and 4b which are located below the liquid levels 22 and 24 respectively. The opening 7a of the discharge connection 7 is advantageously maintained free and the opening 8a of the discharge connection 8, of the chamber 4a, is advantageously terminated below the level 22. In the preferred arrangement, a liquid level sensor 16 is connected to sense the level at the location 14 in chamber 4b and an additional sensor 17 is located to sense the liquid level at the location 15 in chamber 4a. The sensors 16 and 17 are connected to operate an automatically operable valve 18 connected in the inlet conduit 9 in order to regulate the supply of liquid to the vessel 4.

When the apparatus of the invention is used in reactor engineering for aerating and venting tanks with radioactive content (waste water treatment) it is necessary that the longest period of dwell of the air in the tanks be maintained so that short life isotopes may fade while the air remains in the tanks. With the pressure maintaining system of the invention, only so much air is delivered through the preparation installation as is displaced by the inflowing liquid so that a very long period of dwell of the air in the tanks is ensured. It is also ensured that the air displaced from the tanks flows out only through the stuffing box installation which is connected to the conduit 5.

The system of the invention carries out the following functions:

1. The removal of the displaced air and the transfer of the air to a treatment installation. This takes place in the following manner: When none of the sensors of the switches 16 and 17 is in contact with water, the valve 18 is opened and liquid flows through the inlet 9 into the tank 4. The water level increases until the sensor 16 contacts the water at the location 14 and this leads to a closing of the valve 18. The installation is then prepared for operating. If air or other gas is evacuated through the gas suction installation, from each of the chambers 4a and 4b and also from the tanks 1, 2 etc. the water level will rise in the chamber 4a and close the lower end of the conduit 5 so that no further gas is evacuated through the conduit 5. Thus, a further air or gas removal from the tank system is prevented. The conduit 5 is maintained at an underpressure which is set at the underpressure of the operation of the apparatus.

If liquid is supplied to the tanks 1 and 2 the pressure will rise in the chamber 4a to cause a decrease in the liquid level in the chamber and an opening of the conduit 5. The excess air is then supplied to the treatment installation through the gas suction installation conduit 5.

2. The supply of air on discharge of liquid from the tank system 1 and 2.

When the tank system 1 and 2 is operated so that liquid is discharged the underpressure rises in the system. The space in the chamber 4a above the liquid level increases corresponding to the underpressure. This causes a rise of the liquid above the level 15. In the chamber 4b the liquid level falls downwardly and thus frees the lower end of the compensating tube 13. This permits gas flow through the compensating tube 13 into the space 4a and also through the tank system gas collecting conduit 3 into the space 4a until the pressure reaches its normal value again. The liquid flowing back into the space 4b closes the opening of the compensating tube 13.

3. The apparatus provides a security arrangement for the tank system.

The security arrangement acts as follows: If there is a failure in the suction installation 5 and the underpressure falls away, then the liquid flowing back into the space 4b flows off at the location 14 through the discharge conduit 7. If the liquid is supplied to the tank systems 1,2 etc. and the pressure increases, water is displaced from the chamber 4a and flows off at the point 14 until the opening 13a of the compensating tube 13 is cleared in the chamber 4a and thus the system is in connection with the external air chamber 19. In this way the air in excess from the tank systems 1,2 etc. can be discharged to the external air chamber 19 and no dangerous overpressure for the tank installation can build up.

While a specific embodiment of the invention has been shown and described in detail to illustrate the application of the principles of the invention, it will be understood that the invention may be embodied otherwise without departing from such principles.

What is claimed is:

1. An apparatus for accurately maintaining a small underpressure in a tank system which is connected to a gas suction installation, comprising a vessel partly filled with a liquid, a partition extending downwardly from the top of said vessel and below the level of the liquid and defining a first chamber and a second chamber separated by said partition, a tank system having one tank or a plurality of tanks partly filled with liquid and having a tank system gas collecting conduit connected above the liquid level to each of said tanks and connected to said first chamber above the level of the liquid therein, a gas suction installation conduit connected into the first chamber and having a lower end terminating in an opening below the level of the liquid therein, an external air conduit for supplying external air connected into said second chamber, a liquid inlet connected into said vessel below the water level of said second chamber, a first discharge conduit connected to said first chamber, a second discharge conduit connected to said second chamber at a lower level than said first discharge conduit, an equalizing and compensating tube extending through said partition and having respective ends extending downwardly into said first and second chambers respectively terminating at locations below the water level therein, said compensating conduit providing a connection between said first and second chambers when the water levels move below the respective lower ends which are situated in the respective chambers, the ends of said compensating tube lying below the respective lower ends of the connection of the discharge conduits of the respective first and second chambers, the lower end of said suction gas installation conduit terminating in an opening which lies above the connecting opening of said second discharge conduit of said second chamber by an amount corresponding to the desired underpressure and the discharge connection opening into the vessel from said first discharge conduit lying above the termination of said gas suction installation conduit within said first chamber.

2. An apparatus, according to claim 1, including a first liquid level sensor located in said first chamber and having a sensor for sensing the water level in the first chamber at a location adjacent the outlet of the connection of said first discharge, and a second sensor for said second chamber having a water level sensor located adjacent the outlet of the connection of said second chamber liquid discharge for sensing the level of the water at such location, and an automatically operable valve in said liquid inlet connected to said first and second sensors for supplying liquid to said first and second chambers in accordance with the levels which are sensed therein.

3. An apparatus, according to claim 1, wherein said gas suction installation conduit terminates in an opening at its lower end which extends obliquely and which is located within the liquid of said first chamber directly adjacent the level thereof.

* * * * *